United States Patent

[11] 3,620,382

| [72] | Inventor | Charles Gunnar Birger Bergling<br>Orebro, Sweden |
|---|---|---|
| [21] | Appl. No. | 43,850 |
| [22] | Filed | June 5, 1970 |
| [45] | Patented | Nov. 16, 1971 |
| [73] | Assignee | Ingenjorsfirma Hebe AB<br>Orebro, Sweden |
| [32] | Priority | June 12, 1969 |
| [33] | | Sweden |
| [31] | | 8383/69 |

[54] DEVICE FOR CONVEYING REINFORCING ELEMENTS TO A WELDING STATION AND FOR HOLDING AND ALIGNING THESE IN RELATION TO A SHEET OF METAL AT THE WELDING STATION
5 Claims, 1 Drawing Fig.

[52] U.S. Cl. .................................................. 214/1 BT,
294/65.5
[51] Int. Cl. .................................................. B66c 1/06

[50] Field of Search ........................................... 214/1 B, 1
BS, 1 BT, 1 BV; 294/65.5

[56] References Cited
UNITED STATES PATENTS
3,124,260 3/1964 Tidball ........................ 214/1 BB
3,261,481 7/1966 Laverty ....................... 214/1 BSZ Primary Examiner—Gerald M. Forlenza
Assistant Examiner—George F. Abraham
Attorney—Pierce, Scheffler & Parker ABSTRACT: A device is provided for conveying reinforcing or skeleton elements to a welding station and for holding and aligning said elements in relation to a metal sheet at the welding station, said device comprising a traveling carriage having a box or beam construction movably and pivotally mounted thereon, electromagnets being attached to said box or beam construction for holding said reinforcing elements. The electromagnets are arranged in a lower and an upper row, the electromagnets in the lower row being fixed and the electromagnets in the upper row being displaceable, thus enabling the device to handle reinforcing elements of varying sizes.

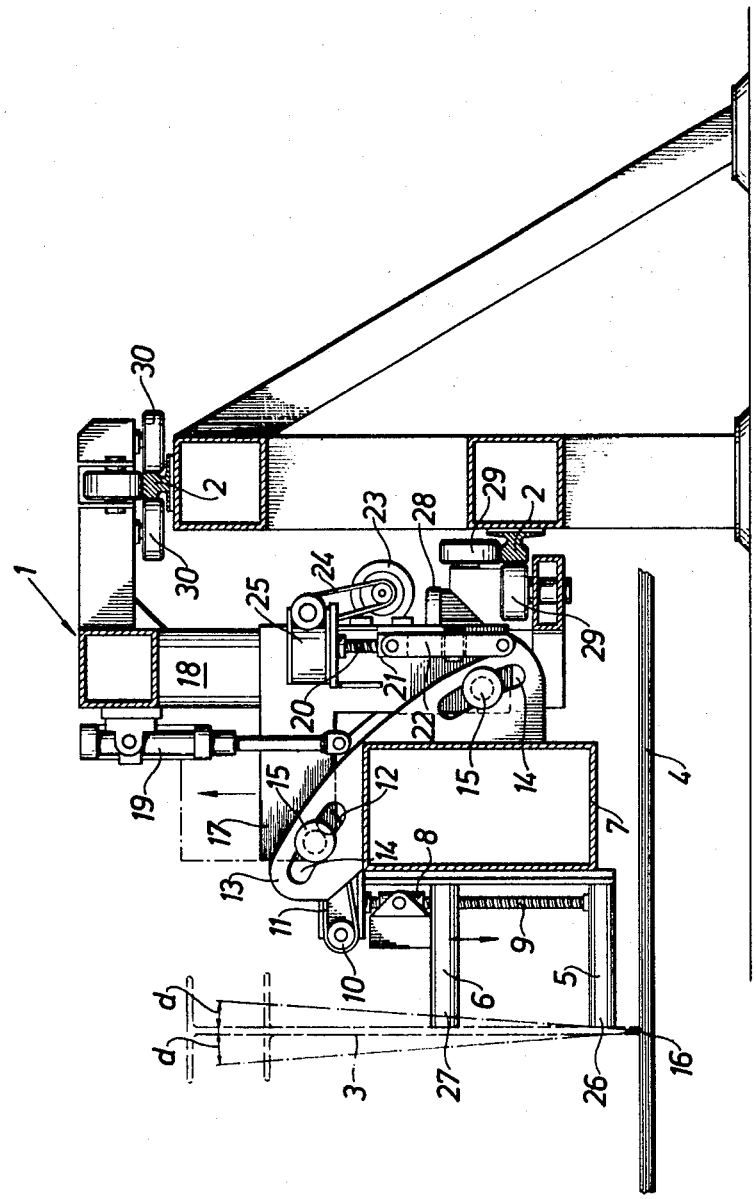

DEVICE FOR CONVEYING REINFORCING ELEMENTS TO A WELDING STATION AND FOR HOLDING AND ALIGNING THESE IN RELATION TO A SHEET OF METAL AT THE WELDING STATION

The invention relates to a device for conveying or feeding reinforcing or skeleton elements to a welding station and for holding and aligning these in relation to a sheet of metal at the welding station to which reinforcing elements are to be welded substantially perpendicularly, particularly suitable for handling ribs for reinforcing sheets of metal for the hulls of ships.

Known devices for conveying or feeding reinforcing or skeleton elements to a sheet of metal in a welding station and aligning the reinforcing element in relation to said sheet are generally tonglike constructions. Thus, the devices cooperate with the reinforcing element on both sides and, consequently, require a great deal of space. There are also considerable difficulties both in aligning the element in relation to the sheet of metal without any part of the element being twisted relative to the rest and in adjusting the gripping means to the size of the reinforcing element.

These disadvantages are eliminated by means of the present invention. Thus, the device according to the invention cooperates only with one side of the reinforcing element, positions the element accurately at a desired angle in relation to the sheet of metal to which it is to be welded, and can also straighten the lower part of the reinforcing element in contact with the sheet, if necessary. Furthermore, the device can very easily be adjusted to reinforcing elements of different sizes. The above advantages, and others which will be evident from the following description, are achieved by the device according to the invention having a traveling carriage on which reinforcing elements are conveyed and which is provided with a rigid box or beam construction carrying a plurality of electromagnets which hold said reinforcing elements and which are arranged in a lower and an upper row, the electromagnets in the lower row being fixed so that they are close to said sheet of metal in the welding station and the electromagnets in the upper row being displaceable in a direction substantially perpendicular to the surface of said sheet of metal, and the box or beam construction being movable in the traveling carriage so that it can be raised or lowered in relation to said sheet of metal for applying the reinforcing element thereon and so that it can be pivoted for turning the held reinforcing element away from a position perpendicular to said sheet of metal if desired.

One embodiment of the invention will now be more fully described with reference to the accompanying drawing showing a side view of a device according to the invention when in a welding station, not shown in detail. A traveling carriage 1 provided with a conventional driving device, not shown in detail, comprising a motor 28, is provided with wheels 29 and 30 and can be moved along rails 2 in a direction perpendicular to the plane of the paper. The reinforcing element 3 transported on the carriage is held and aligned to the sheet of metal 4 by means of a plurality of electromagnets 5 and 6. The electromagnets are arranged in two rows on an extremely rigid box or beam construction 7, this being part of the carriage, the longitudinal direction of said construction being perpendicular to the plane of the paper. The electromagnets 5 in the lower row are firmly attached to the construction 7 as close to the metal sheet 4 as possible. The electromagnets 6 in the upper row are displaceably mounted on the construction 7. Each electromagnet 6 is attached to a nut 8 which is threaded onto a screw 9. The screw 9 is rotated by means of a worm gear 10 which is driven from a shaft 12 through a chain 11. This shaft, which extends along the entire length of the box or beam construction 7, is common for all of the upper electromagnets 6. Thus by rotating the shaft 12, the electromagnets to can be lowered or raised as desired to a position suitable with respect to the height of the reinforcing element 3.

The box or beam construction 7 is provided with brackets 13 for attachment to the carriage 1. These brackets have been provided with slots 14 which, together with journal pins 15 attached to members 17 arranged in the carriage, provide the pivotable assembly of the box or beam construction in the carriage 1. The slots 14 are arc-shaped and preferably describe the periphery of a circle, the center point of which is situated on the contact line 16 between the reinforcing element 3 and the metal sheet 4. In this way the reinforcing element may easily be inclined an angle $\alpha$ to the vertical plane, when desired. Also, means for activating and pivoting the brackets 13 are attached to said member 17. A nut 21 arranged on a screw 20 is joined by means of a link arm 22 to the lower part of the bracket 13. The screw 20 is rotated by means of an adjustment handle 23 through a chain 24 and a worm gear 25. The upward or downward movement of the nut 21 is transferred to the above-mentioned pivoting movement of the bracket 13 by means of the link arm 22, slots 14 and journal pins 15 so that the reinforcing element 3 is given the desired inclination.

Said members 17 can be raised and lowered in the carriage 1. Each member is displaceable along a column 18 and is activated by means of a hydraulic piston 19. Consequently, the box or beam construction can be raised while the reinforcing element is being conveyed so there is no risk of it bumping against any obstructions lying at a higher level than the metal sheet. In the welding station the members 17 are lowered so that the reinforcing element 3 is pressed firmly against the metal sheet 4.

The surfaces 26 and 27 of the electromagnets which cooperate with the reinforcing element are flat and lie all in the same plane. By arranging the electromagnets 5 in the lower row close to the lower edge of the reinforcing element 3 and suitably spaced, this lower edge can be straightened, if it is not straight before the reinforcing element is pressed against the metal sheet 4 by the member 17 being lowered by means of the hydraulic piston 19. By arranging the electromagnets 6 of the upper row offset in the longitudinal direction of the box or beam construction 7 relative to the lower row of electromagnets 5, the former can be lowered between the latter and to the same level as these, if desired.

What is claimed is:

1. A device for conveying reinforcing elements to a welding station and for holding and aligning these in relation to a sheet of metal at the welding station to which reinforcing elements are to be welded substantially perpendicularly, characterized by a traveling carriage (1) on which reinforcing elements (3) are conveyed and which is provided with a rigid box or beam construction (7) carrying a plurality of electromagnets (5, 6) which hold said reinforcing elements and which are arranged in a lower and an upper row, the electromagnets in the lower row (5) being fixed so that they are close to said sheet of metal (4) in the welding station and the electromagnets in the upper row (6) being displaceable in a direction substantially perpendicular to the surface of metal, sheet of metal, and the box or beam construction (7) being movable in the traveling carriage (1) so that it can be raised or lowered in relation to said sheet of metal for applying the reinforcing element (3) thereon and so that it can be pivoted for turning the held reinforcing element away from a position perpendicular to said sheet of metal if desired.

2. A device according to claim 1, characterized in that the box or beam construction (7) is arranged to be pivoted about an axis through the line of contact (16) between the reinforcing element and said sheet of metal (4) by means of brackets (13), said brackets being attached to the construction and having slots (14) therein, said slots constituting parts of a circle arc and cooperating with journal pins (15) attached to the carriage.

3. A device according to claim 2 characterized in that said journal pins (15) are attached to members (17) which can be raised and lowered in the carriage, said members also carrying activating members (20, 21, 22, 23, 24, 25) to displace said brackets (13) relative to the journal pins.

4. A device according to claim 1 characterized in that the surfaces (26, 27) of the electromagnets cooperating with the reinforcing element (3) are flat and lie in the same plane.

5. A device according to claim 1 characterized in that the electromagnets (6) in the upper row are displaced in the longitudinal direction of the box or beam construction (7) relative to the electromagnets (5) in the lower row, so that the former can be lowered between the latter to the same level as these.

* * * * *